(12) United States Patent
Kaczyński et al.

(10) Patent No.: US 11,122,014 B2
(45) Date of Patent: Sep. 14, 2021

(54) USER DEVICE AND METHOD OF PROVIDING NOTIFICATION IN MESSAGING APPLICATION ON USER DEVICE

(71) Applicant: V440 SPÓŁKA AKCYJNA, Warsaw (PL)

(72) Inventors: Kamil Kaczyński, Warsaw (PL); Michał Glet, Warsaw (PL)

(73) Assignee: V440 SPÓŁKA AKCYJNA, Warsaw (PL)

( * ) Notice: Subject to any disclaimer, the term of this patent is extended or adjusted under 35 U.S.C. 154(b) by 297 days.

(21) Appl. No.: 16/257,338

(22) Filed: Jan. 25, 2019

(65) Prior Publication Data

US 2020/0244627 A1 Jul. 30, 2020

(51) Int. Cl.
*H04L 29/06* (2006.01)
*G06F 16/27* (2019.01)

(52) U.S. Cl.
CPC .......... *H04L 63/0428* (2013.01); *G06F 16/27* (2019.01)

(58) Field of Classification Search
CPC . H04L 63/0428; H04L 9/3213; H04L 9/0631; H04L 9/0894; H04L 63/061; H04L 9/0863; H04L 63/102; G06F 16/27
See application file for complete search history.

(56) References Cited

U.S. PATENT DOCUMENTS

| | | | | |
|---|---|---|---|---|
| 6,393,568 B1* | 5/2002 | Ranger | ................. | G06F 21/562 713/188 |
| 7,069,591 B1* | 6/2006 | Weicher | ............. | G06F 21/6218 726/26 |
| 8,180,891 B1* | 5/2012 | Harrison | .......... | H04N 21/64322 709/224 |
| 8,532,627 B1* | 9/2013 | Nassimi | ........... | H04M 3/42153 455/412.2 |
| 10,013,560 B1* | 7/2018 | Anderson | ............. | G06F 21/572 |
| 10,149,156 B1* | 12/2018 | Tiku | .................. | H04M 3/42059 |
| 10,637,837 B1* | 4/2020 | Lowry | ............... | H04L 63/0435 |
| 10,749,689 B1* | 8/2020 | Peddada | ............... | H04L 9/3263 |
| 2002/0178271 A1* | 11/2002 | Graham | ................. | H04L 67/02 709/229 |
| 2005/0081045 A1* | 4/2005 | Nicodemus | ......... | H04L 63/0414 713/182 |

(Continued)

*Primary Examiner* — Aravind K Moorthy
(74) *Attorney, Agent, or Firm* — Ziegler IP Law Group, LLC

(57) ABSTRACT

A user device stores a messaging application and an encrypted database, processor and has a key store storing an authorisation token to be used by the messaging application. The messaging application is configured, in the unlaunched state, to retrieve the authorisation token from the key store to perform communication with the messaging server on receipt of an incoming call from the messaging server and to display a notification without contact information, and is configured, in the launched state, on receipt of an incoming call from the messaging server to retrieve the authorisation token from volatile memory to perform communication with the messaging server, and to display a notification of the incoming call with contact information for a calling party, on the display of the user device. The encryption key for the database is generated based on a user passcode, and the user device stores neither the user's passcode nor a hash of the passcode.

16 Claims, 4 Drawing Sheets

(56) References Cited

U.S. PATENT DOCUMENTS

| | | | |
|---|---|---|---|
| 2007/0149179 A1* | 6/2007 | Kashiwabara | H04M 1/2757 455/415 |
| 2007/0174477 A1* | 7/2007 | Bostick | H04L 61/1547 709/231 |
| 2007/0291789 A1* | 12/2007 | Kutt | H04L 63/0428 370/467 |
| 2008/0051072 A1* | 2/2008 | Kraft | H04M 1/2748 455/418 |
| 2010/0216440 A1* | 8/2010 | Heikkila | H04Q 3/72 455/415 |
| 2011/0314534 A1* | 12/2011 | James | G06F 21/53 726/9 |
| 2013/0054968 A1* | 2/2013 | Gupta | H04L 63/08 713/168 |
| 2013/0067239 A1* | 3/2013 | Gupta | H04L 63/0428 713/189 |
| 2013/0091543 A1* | 4/2013 | Wade | H04W 12/086 726/1 |
| 2013/0247160 A1* | 9/2013 | Hillier | H04L 63/0869 726/7 |
| 2014/0137246 A1* | 5/2014 | Baluda | G06F 21/568 726/22 |
| 2014/0189781 A1* | 7/2014 | Manickam | H04L 67/34 726/1 |
| 2014/0378099 A1* | 12/2014 | Huang | H04M 1/67 455/411 |
| 2015/0172290 A1* | 6/2015 | Lai | H04L 9/321 713/155 |
| 2015/0262084 A1* | 9/2015 | Saxena | G06Q 10/00 705/59 |
| 2015/0271325 A1* | 9/2015 | Lee | H04W 4/16 455/414.1 |
| 2015/0281234 A1* | 10/2015 | Sylvain | H04L 63/061 726/1 |
| 2015/0319168 A1* | 11/2015 | McCarty | H04L 63/0861 713/186 |
| 2015/0326536 A1* | 11/2015 | Gonen | H04L 63/0492 726/26 |
| 2016/0065712 A1* | 3/2016 | Zhekov | H04M 19/04 455/567 |
| 2016/0092868 A1* | 3/2016 | Salama | G06Q 20/3829 705/41 |
| 2016/0277369 A1* | 9/2016 | Lee | H04L 63/061 |
| 2016/0366110 A1* | 12/2016 | Shahbaz | H04W 4/12 |
| 2017/0156050 A1* | 6/2017 | Khairmode | H04M 3/02 |
| 2017/0169196 A1* | 6/2017 | Monsifrot | G06F 8/71 |
| 2017/0272569 A1* | 9/2017 | Shapiro | H04L 67/20 |
| 2017/0346804 A1* | 11/2017 | Beecham | H04L 63/083 |
| 2017/0373853 A1* | 12/2017 | Soman | G06F 21/56 |
| 2018/0176023 A1* | 6/2018 | Prickett | G06F 21/12 |
| 2018/0352440 A1* | 12/2018 | Ballard | H04W 12/068 |
| 2019/0080372 A1* | 3/2019 | Richardson | G06Q 30/0282 |
| 2019/0114631 A1* | 4/2019 | Madhu | G06Q 20/38215 |
| 2019/0130122 A1* | 5/2019 | Barnes | G06F 12/1408 |
| 2019/0132629 A1* | 5/2019 | Kendrick | G06F 16/9017 |
| 2019/0356649 A1* | 11/2019 | Alwen | H04L 9/3218 |
| 2019/0356650 A1* | 11/2019 | Leavy | H04L 63/0815 |
| 2020/0099515 A1* | 3/2020 | Hopkins | H04L 9/0891 |
| 2020/0106615 A1* | 4/2020 | Rule | H04L 9/0866 |
| 2020/0228534 A1* | 7/2020 | Chen | H04L 9/321 |
| 2020/0242219 A1* | 7/2020 | Kaczynski | H04L 51/046 |
| 2021/0029089 A1* | 1/2021 | Lewin | H04L 63/102 |

* cited by examiner

USER DEVICE AND METHOD OF PROVIDING NOTIFICATION IN MESSAGING APPLICATION ON USER DEVICE

TECHNICAL FIELD

The aspects of the disclosed embodiments relate generally to messaging applications; and more specifically, to user devices and method of providing notifications in a messaging application for effecting a secure messaging session. Furthermore, the present invention relates to a computer program product for providing notifications in a messaging application for effecting a secure messaging session, the computer program product comprising non-transitory machine-readable data storage having stored thereon program instructions.

BACKGROUND

With the advance of digital technology, the ability to share and retrieve data has become easier and more efficient and secure, but security remains an issue. Frequently, such transactions relating to confidential data rely on encryption techniques. Encryption techniques make it harder for third-parties to extract intelligible content from the transferred encrypted data and from such data stored in encrypted databases. Software applications may store business data associated with the application, in databases in encrypted form.

Typically, a given software application performs decryption of stored encrypted business data upon receiving credentials (such as a passcode, a unique identifier, a unique pattern, and so forth) from a user of the given software application. But the security of encryption depends upon the security of the password or other credentials needed to reverse the encryption. Easily deduced passwords, such as "password", the name of a user's pet, child or special person, or birth or marriage dates, make it easy for wrongdoers to obtain access to encrypted information. But even complex or unpredictable passwords may also be "cracked" if a hash of the password can be accessed, for example from a data store of a user device that is used with the encrypted data. It is common for smartphones and other user devices to store a hash of user passwords or encryption keys, but it has become increasingly easier to crack such hashes using online tools or services if access to such hashes is obtained.

A problem can also arise with the functionality of software applications in encrypted systems. Lack of business data relating to a user, prior to obtaining the user's credentials, may prevent the given software application from functioning correctly. For example, the given software application may be a messaging software application, and business data pertaining to a user of the given software application may include a user profile, system data, a message history of the user, and a call history of the user, etc., and these may be stored in encrypted form. If a message is sent, or a call made to a user of the messaging application before the user has provided login credentials to the messaging application, no notification relating to the call or message may be able to reach the user because system data necessary to perform communication with the messaging application on the user's device is still encrypted.

Therefore, in light of the foregoing discussion, there exists a need to overcome the aforementioned drawbacks associated with messaging applications that rely on encryption for data security.

SUMMARY

The aspects of the disclosed embodiments seek to provide user devices having a messaging application for effecting a secure messaging session. The present invention also seeks to provide a method of providing notifications in a messaging application loaded on a user device. An aim of the present invention is to provide a solution that overcomes, at least partially, the problems encountered in the prior art, and provides a secure messaging application and method.

In a first aspect, the present disclosure provides a user device comprising:
 a display;
 computer storage configured to store: a messaging application for effecting a secure messaging session between the user device and at least one remote device, via a network and a messaging server; and an encrypted database of data associated with the messaging application;
 a processor configured to execute the messaging application;
 a key store storing an authorisation token to be used by the messaging application;
 the messaging application having a launched state and an unlaunched state, and on transitioning from the unlaunched state to the launched state the messaging application is configured to cause the database to be decrypted and to store the authorisation token in volatile memory, and on transitioning from the launched state to the unlaunched state the messaging application causes the database to be encrypted and the authorisation token deleted from the volatile memory;
 wherein the messaging application is configured, in the unlaunched state, on receipt of an incoming call from the messaging server, to retrieve the authorisation token from the key store to perform communication with the messaging server, and to display a notification of the incoming call, without contact information, on the display of the user device; and wherein the messaging application is configured, in the launched state, on receipt of an incoming call from the messaging server, to retrieve the authorisation token from the volatile memory to perform communication with the messaging server, and to display a notification of the incoming call, and contact information for a calling party, on the display of the user device.

Preferably, in the first aspect the messaging application is configured, in the unlaunched state, on receipt of an incoming message from the messaging server, to retrieve the authorisation token from the key store to perform communication with the messaging server, and to display a notification of the incoming message on the display of the user device without contact information and without a message preview; and wherein the messaging application is configured, in the launched state, on receipt of an incoming message from the messaging server, to retrieve the authorisation token from the volatile memory to perform communication with the messaging server, and to display a notification of the incoming message, contact information for a messaging party, and the message preview, on the display of the user device.

In a second aspect, the present disclosure provides a method of providing notification of a call received in a messaging application loaded on a user device, the user device comprising:
 a display;
 computer storage configured to store: the messaging application for effecting a secure messaging session between the user device and at least one remote device, via a network and a messaging server; and an encrypted database of data associated with the messaging application;

a processor configured to execute the messaging application;

a key store storing an authorisation token to be used by the messaging application;

the messaging application having a launched state and an unlaunched state, and on transitioning from the unlaunched state to the launched state the messaging application is configured to cause the database to be decrypted and to store the authorisation token in volatile memory, and on transitioning from the launched state to the unlaunched state the messaging application causes the database to be encrypted and the authorisation token deleted from the volatile memory;

the method comprising:

if the messaging application is in the unlaunched state, on receipt of an incoming call from the messaging server, retrieving the authorisation token from the key store to perform communication with the messaging server, and displaying a notification of the incoming call, without contact information, on the display of the user device; and if the messaging application is in the launched state, on receipt of an incoming call from the messaging server, retrieving the authorisation token from the volatile memory to perform communication with the messaging server, and displaying a notification of the incoming call, and contact information for the calling party, on the display of the user device.

In a third aspect, an embodiment of the present disclosure provides a computer program product comprising a messaging application stored on a tangible computer readable storage medium and configured when executed on a processor of a user device to effect a secure messaging session between the user device and at least one remote device via a network and a messaging server, the messaging application having a launched state and an unlaunched state, and on transitioning from the unlaunched state to the launched state the messaging application is configured to cause an encrypted database of data, associated with the messaging application stored on the user device, to be decrypted and to store the authorisation token in a volatile memory of the user device, and on transitioning from the launched state to the unlaunched state the messaging application is configured to cause the database to be encrypted and the authorisation token to be deleted from the volatile memory;

wherein the messaging application is configured, in the unlaunched state, on receipt of an incoming call from the messaging server, to retrieve the authorisation token from the key store to perform communication with the messaging server, and to display a notification of the incoming call on a display of the user device; and wherein the messaging application is configured, in the launched state, on receipt of an incoming call from the messaging server, to retrieve the authorisation token from the volatile memory to perform communication with the messaging server, and to display a notification of the incoming call, and contact information for the calling party, on a display of the user device.

In a fourth aspect, an embodiment of the present disclosure provides a user device comprising:

a display;

computer storage configured to store: a messaging application for effecting a secure messaging session between the user device and at least one remote device, via a network and a messaging server; and an encrypted database of data associated with the messaging application;

a processor configured to execute the messaging application;

a key store storing an authorisation token to be used by the messaging application;

the messaging application having a launched state and an unlaunched state, and on transitioning from the unlaunched state to the launched state the messaging application is configured to cause the database to be decrypted and to store the authorisation token in volatile memory, and on transitioning from the launched state to the unlaunched state the messaging application causes the database to be encrypted and the authorisation token deleted from the volatile memory;

wherein the messaging application is configured, in the unlaunched state, on receipt of an incoming message from the messaging server, to retrieve the authorisation token from the key store to perform communication with the messaging server, and to display a notification of the incoming message on the display of the user device without contact information and without a message preview; and wherein the messaging application is configured, in the launched state, on receipt of an incoming message from the messaging server, to retrieve the authorisation token from the volatile memory to perform communication with the messaging server, and to display a notification of the incoming message, contact information for a messaging party, and the message preview, on the display of the user device.

Embodiments of the present disclosure substantially eliminate or at least partially address the aforementioned problems in the prior art.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present invention as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present invention, exemplary constructions of the invention are shown in the drawings. However, the present invention is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
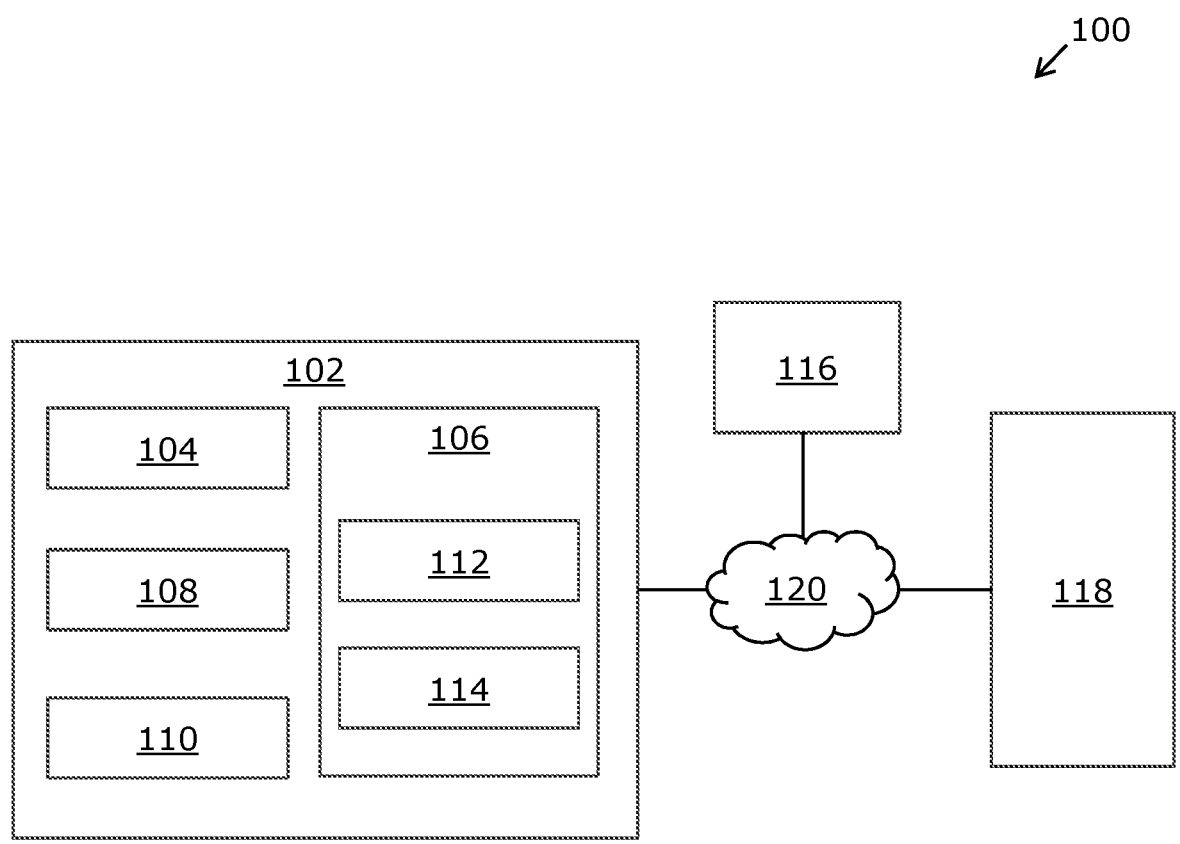
FIG. 1 is a schematic illustration of a network environment in which a user device having a messaging application is implemented for effecting a secure messaging session and providing notification of a call received in the messaging application, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present invention are disclosed, those skilled in the art will recognize that other embodiments for carrying out or practicing the present invention are also possible.

In one aspect, an embodiment of the present disclosure provides a user device comprising:

a display;

computer storage configured to store: a messaging application for effecting a secure messaging session between the user device and at least one remote device, via a network and a messaging server; and an encrypted database of data associated with the messaging application;

a processor configured to execute the messaging application;

a key store storing an authorisation token to be used by the messaging application;

the messaging application having a launched state and an unlaunched state, and on transitioning from the unlaunched state to the launched state the messaging application is configured to cause the database to be decrypted and to store the authorisation token in volatile memory, and on transitioning from the launched state to the unlaunched state the messaging application causes the database to be encrypted and the authorisation token deleted from the volatile memory;

wherein the messaging application is configured, in the unlaunched state, on receipt of an incoming call from the messaging server, to retrieve the authorisation token from the key store to perform communication with the messaging server, and to display a notification of the incoming call, without contact information, on the display of the user device; and wherein the messaging application is configured, in the launched state, on receipt of an incoming call from the messaging server, to retrieve the authorisation token from the volatile memory to perform communication with the messaging server, and to display a notification of the incoming call, and contact information for the calling party, on the display of the user device.

In another aspect, an embodiment of the present disclosure provides a method of providing notification of a call received in a messaging application loaded on a user device, the user device comprising:

a display;

computer storage configured to store: the messaging application for effecting a secure messaging session between the user device and at least one remote device, via a network and a messaging server; and an encrypted database of data associated with the messaging application;

a processor configured to execute the messaging application;

a key store storing an authorisation token to be used by the messaging application;

the messaging application having a launched state and an unlaunched state, and on transitioning from the unlaunched state to the launched state the messaging application is configured to cause the database to be decrypted and to store the authorisation token in volatile memory, and on transitioning from the launched state to the unlaunched state the messaging application causes the database to be encrypted and the authorisation token deleted from the volatile memory;

the method comprising:

if the messaging application is in the unlaunched state, on receipt of an incoming call from the messaging server, retrieving the authorisation token from the key store to perform communication with the messaging server, and displaying a notification of the incoming call, without contact information, on the display of the user device; and if the messaging application is in the launched state, on receipt of an incoming call from the messaging server, retrieving the authorisation token from the volatile memory to perform communication with the messaging server, and displaying a notification of the incoming call, and contact information for the calling party, on the display of the user device.

The aforesaid user device in which the messaging application is implemented, and the method of providing notification of a call received in the messaging application loaded on the user device, can be implemented using a computer implemented application for providing notification for an incoming call received from the calling party based on preferences of the user. Specifically, we extract the data necessary to perform the said function, such as an authorisation token, from a database of data associated with the messaging application, and we store this securely, but unencrypted, on the user device, for example in the key store of the user device. Typically, the key store is provided as part of the operating system of the user device. By storing the necessary data to enable the messaging application to communicate with the messaging server, notifications of calls and messages can be received from the messaging server and displayed appropriately on the user device even when the messaging applications database is still encrypted. The messaging application operates to provide notification to the user based on the preferences of the user stored in the extracted data that is further stored securely. Notification is provided to the user without decrypting the encrypted database in an unlaunched state of the messaging application.

In overview, embodiments of the present disclosure are concerned with a user device and a messaging application loaded therein, for effecting a secure messaging session and a method of providing notification of a call or message received in the messaging application.

Throughout the present disclosure, the term "user device" as used herein, refers to an electronic device associated with (or used by) a user that enables the user to operate the messaging application on the user device. Furthermore, the expression "user device" is intended to be broadly interpreted to include any electronic device that may be used for voice and/or data communication over a wireless communication network. Examples of user device include, but are not limited to, cellular phones, smartphones, tablet computers (e.g. iPads), personal digital assistants (PDAs), handheld devices, wireless modems, laptop computers, personal computers, et cetera. Additionally, the user device includes (as discussed in more detail later, herein) a casing, a memory, a processor, a network interface card, a microphone, a speaker, a display, and a keypad (that may be displayed on the display rather than being a separate physical entity).

It will be appreciated that the term 'user' refers to any entity including a person (i.e., human being) or a virtual personal assistant (an autonomous program or a bot) using the user device described herein. Optionally, the user is a person having knowledge pertaining to use of the messaging application. Optionally, in this regard, the user of the messaging application defines preferences for various contacts of the user on the messaging application.

As mentioned previously, the user device comprises a display. Typically, the display of the user device is an output device employed for presenting information to the user in a visual form. Pursuant to embodiments of the present disclosure, the display refers to an equipment housed in the user device that facilitates presentation of elements of the messaging application (such as a user-interface of the messaging application) thereupon. Examples of the display may include, but are not limited to, Electroluminescent display, Liquid crystal display, Light-emitting diode (LED) display, OLED display, AMOLED display, plasma display, and quantum dot display. Optionally, the display employs a display method to present information based on optical changes for example, transmission-absorption, transmission-dispersion, dispersion-absorption, and so forth. More optionally, the display can be monochrome or colour. Furthermore, the display may be implemented by way of single layer or multiple layers.

Furthermore, the user device comprises a computer storage configured to store a messaging application for effecting the secure messaging session between the user device and the at least one remote device, via the network and the messaging server, and the database of data associated with the messaging application. Throughout the present disclosure, the term "computer storage" as used herein refers to a storage medium or storage media used for storing, porting and extracting data files, software and objects. It will be appreciated that the computer storage enables temporary as well as permanent storage of the data files, software and objects for any duration. Optionally, the computer storage may be implemented as a hardware device. More optionally, the computer storage may be internal or external to a computing device such as the user device. Furthermore, the computer storage may encompass distributed processing capability, memory capability and/or storage capability. Examples of various types of computer storage comprised in the user device may include, but are not limited to, Random Access Memory (RAM), Read Only Memory (ROM), cache, hard disk, optical disk drives, externally connected USB devices, Flash drive, Network Attached storage (NAS), Solid State Drive (SSD), and Cloud storage.

Throughout the present disclosure, the term "messaging application" as described herein refers to platform implemented by a set of instructions. Moreover, the platform is executable by a computing system (such as the user device) or other digital system so as to configure the computing system or other digital system to perform a task that is the intent of the platform. Pursuant to embodiments of the present disclosure, the messaging application configures the user device to perform tasks such as messaging, voice calling, video calling, and so forth, as instructed by the user of the user device. Optionally, the messaging application refers to a software application. Optionally, in such a case, the messaging application is received (for example, downloaded) from a server arrangement (such as the messaging server, as discussed later herein) or a trusted third party. The trusted third party can be a publicly-accessible digital distribution platform, for example, such as Google Play®, the App Store® (for iOS®) and the like.

Additionally, the messaging application encompasses the set of instructions stored in storage media such as RAM, a hard disk, optical disk, or so forth, and is also intended to encompass so-called "firmware" that is software stored on a ROM or so forth. Optionally, the storage medium of the messaging application may be implemented by the computer storage of the user device. More optionally, the messaging application is organized in various ways, for example the messaging application includes software components organized as libraries, Internet-based programs stored on a remote server or so forth, source code, interpretive code, object code, directly executable code, and so forth. It will be appreciated that the messaging application may invoke system-level code or calls to other software or application residing on a server or other location to perform certain functions. Furthermore, the messaging application may be pre-configured and pre-integrated with an operating system (such as operating system of the user device), building a software appliance. Optionally, the messaging application includes database programs, word processors, web browsers, and spreadsheets.

Furthermore, the messaging application effects secure messaging session between the user device and at least one remote device. Specifically, the messaging application enables creation, storage, exchange, and management of messages (for example, text, images, voice, video, telex, fax, e-mail, paging, and electronic data) over a network. Typically, the messages are specifically, formatted data that describe events, requests, replies, and so forth.

Moreover, the secure messaging session between the user device and the at least one remote device, effected by the messaging application refers to exchange or transaction of sensitive data (namely, confidential messages) from the user of the user device to one or more users of the at least one remote device. Optionally, the secure messaging session is implemented by way of encryption techniques, wherein the confidential messages are encrypted using encryption keys. Furthermore, the encrypted confidential message is transmitted over the network and/or the messaging server from the user device to the at least one remote device. Beneficially, the secure messaging session prevents third party from deriving intelligible information by intercepting the transmission of the encrypted confidential messages.

It will be appreciated that the remote device may be a portable computing device (that may have identical functionality and configuration as the user device). Examples of the at least one remote device include cellular phones, personal digital assistants (PDAs), handheld devices, wireless modems, laptop computers, personal computers, et cetera.

The messaging application effects the secure messaging session between the user device and the at least one remote device, via the network and the messaging server. Typically, the term "network" refers to an arrangement of interconnected programmable and/or non-programmable components that are configured to facilitate data communication between one or more electronic devices and/or databases. Furthermore, the network may include, but is not limited to, one or more of a peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Frame Relay, or Asynchronous Transfer Mode (ATM).

Furthermore, the term "messaging server" refers to a message exchange program for the messaging application. Specifically, the messaging server refers to a structure and/or module that include programmable and/or non-programmable components configured to store, process and/or share information. Optionally, the messaging server includes any arrangement of physical or virtual computational entities capable of enhancing information to perform various computational tasks. Furthermore, it will be appreciated that the messaging server may be both single hardware server and/or plurality of hardware servers operating in a parallel or distributed architecture. In an example, the messaging server may include components such as memory, a processor, a network adapter and the like, to store, process and/or share information with other computing components, such as user device and the at least one remote device.

Optionally, the messaging server is implemented as a computer program that provides various services (such as database service) to other devices, modules or apparatus. Furthermore, optionally, the messaging server can perform operations such as queuing, and prioritizing incoming calls, outgoing calls, incoming messages, and/or outgoing messages for the user of the user device having the messaging application. More optionally, the messaging server is implemented using a point-to-point model or a publish/subscribe model.

Moreover, the computer storage is configured to store the encrypted database of data associated with the messaging application. Notably, the term "database" refers to an organized body of digital information. Optionally, the database may be hardware, software, firmware and/or any combination thereof. For example, the organized body of related data may be in the form of a table, a map, a grid, a packet, a datagram, a file, a document, a list or in any other form. The database includes any data storage software and system, such as, for example, a relational database like IBM DB2 and Oracle 9. Furthermore, the database implemented as one or more databases may be created and managed by a software program (namely, database management system). Optionally, the database may support relational operations, regardless of whether it enforces strict adherence to the relational model.

Additionally, the database is populated by data elements. Furthermore, the data elements may include data records, bits of data, cells, and these terms are used interchangeably herein and all intended to mean information stored in cells of the database. Pursuant to embodiments of the present disclosure, the data elements comprise data associated with the messaging application. Optionally, data associated with the messaging application may include, for example, a list of a plurality of contacts, a setting corresponding to the plurality of contacts, a setting corresponding to the messaging application, a set of folders comprising messages such as inbox, outbox, drafts, sent, and so forth, a setting pertaining to the set of folders, et cetera.

The encrypted database of data associated with the messaging application is encrypted using an encryption key. In embodiments of the present invention, the encryption key is generated by the messaging application to encrypt and decrypt the database. It will be appreciated that the encryption key is created with algorithms designed to ensure that the encryption key is unique and unpredictable.

Optionally, the encrypted database is encrypted using AES256. Specifically, the encryption key uses 256-bit Advanced Encryption Standard (AES) algorithm key to encrypt the database of data associated with the messaging application. More specifically, the AES256 has a fixed block size of 128 bits, and a key size of 128 bits. Moreover, optionally, the AES256 encryption key performs fourteen transformation rounds to convert the database of data associated with the messaging application to the encrypted database.

Preferably, the encryption key for encryption of the database is generated based on the user passcode defined for access to the user device. The user passcode may be a string of characters that is used to gain access to the device or to certain aspects of the device's functionality.

In preferred embodiments of the present disclosure, neither the passcode nor any hash or representation of the passcode is stored on the device. Consequently, in these embodiments no comparison is made between an entered passcode and the passcode established for (and generally by) the user. Instead, in these preferred embodiments, the messaging application derives an encryption key from any entered passcode, but only if the entered passcode is the correct one will the database become readable. The messaging application may further be configured to erase the encrypted database in the event that too many (more than a threshold number of) attempts is made to access the database without entering the correct passcode. This approach can significantly increase the security of the messaging application.

The user passcode may be implemented by way of numbers, alphabets, symbols, or a combination thereof. Moreover, optionally, but less preferably, the user passcode may be implemented by way of biometric inputs such as voice, iris, fingerprint, et cetera. It is preferred to use a character sequence, rather than a biometric measure as the passcode, because rogue actors can easily overpower a user to force a biometric match against a user's will (for example, with the user unconscious or even dead), whereas the generation of the correct but unknown character sequence is actually harder to compel.

In an example, the encryption key for encryption of the database is an AES256 key.

The user device comprises a processor configured to execute the messaging application. Throughout the present disclosure, the term "processor" refers to a computational element that is operable to respond to and processes instructions that drive the messaging application loaded in the user device. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, the one or more individual processors, processing devices and elements are arranged in various architectures for responding to and processing the instructions that drive the user device.

Furthermore, the user device comprises a key store storing an authorisation token to be used by the messaging application. Throughout the present disclosure, the term "key store" refers to a repository that enables storage of cryptographic keys therein. Pursuant to embodiments of the present disclosure, the key store is the repository of an operating system of the user device that enables the messaging application to store the authorisation token. Examples of the operating system (OS) of the user device include, for example, Android®, Windows®, macOS®, iOS®, chrome OS®, Blackberry OS®, Linus OS®, and so forth. Moreover, the key store prevents unauthorized extraction of the authorisation token from the user device. Optionally, the authorisation token is implemented by way of a database.

Typically, the "authorisation token" refers to a string of bits that stores information therein. Optionally, the authentication token is implemented as a single element of a programming language, for example, JavaScript, C++, and so forth. More optionally, the authorisation token comprises at least one of: constants, identifiers, operators, separators, and reserved words. Pursuant to embodiments of the present disclosure, the authorisation token comprises extracted information from the database of data associated with the messaging application. Typically, the extracted information in the authorisation token is a minimal set of data that is necessary to perform communication with the messaging server in response to the incoming call and/or incoming message. Moreover, such extracted information in the authorisation token may be used by the messaging application only to perform tasks when the messaging application is in the unlaunched state (as discussed later herein), while the database of data associated with the messaging application is still encrypted.

In an embodiment, the encryption key may be encrypted, wherein the encryption key is encrypted using the user passcode. In another embodiment, the encryption key may be a plaintext key, wherein the encrypted key is not encrypted owing to a user passcode not having been defined. Optionally, the encryption key employed for the encryption of the database is stored in the key store of the user device. Furthermore, the key store offers facilities to restrict the usage of the encryption key and the authorisation token such as, for example, by requiring the user passcode for accessing the encryption key and/or the authorisation token, or restricting a mode of operation of the encryption key (such as restricting the operation of the encryption key when the messaging application is in the unlaunched state), and restricting a mode of operation of the authorisation token (such as restricting the operation of the authorisation token when the messaging application is in the launched state).

The messaging application has a launched state and an unlaunched state, and on transitioning from the unlaunched state to the launched state the messaging application is configured to cause the database to be decrypted and to store the authorisation token in volatile memory, and on transitioning from the launched state to the unlaunched state the messaging application causes the database to be encrypted and the authorisation token deleted from the volatile memory. The term "launched state" refers to an initialised state of a software application when the software application can be operated. The launched state is an initialised state of the messaging application in which the user can operate the messaging application on the user device. It will be appreciated that the messaging application runs in foreground and receives events (such as notification) in the launched state. Additionally, the messaging application is responsive to inputs provided by the user, via a graphical user interface presented on the display of the user device.

Conversely, the "unlaunched state" of the messaging application refers to a state of the messaging application when the user is unable to operate the messaging application. Optionally, in the unlaunched state, the messaging application may be in a not-running state, an inactive state, or a suspended state. Specifically, in the not-running state, the messaging application has not been launched or was terminated, either by the user or the user device. Furthermore, in the background state the messaging application is executing the set of instructions that control it but it is not visible on the graphical user interface of the user device.

Additionally, in the suspended state the messaging application is in the computer storage of the user device but is not executing the set of instructions.

Optionally, the user provides the user passcode to enable the transition of the messaging application from the unlaunched state to the launched state, via the graphical user interface of the messaging application presented on the display of the user device. Moreover, the graphical user interface refers to structured set of user interface elements rendered on the display of the user device. Additionally, the graphical user interface is operable to interact with the user to convey graphical and/or textual information and receive input from the user. Furthermore, the graphical user interface elements refer to visual objects that have a size and position therein. Text blocks, labels, text boxes, list boxes, lines, and images windows, dialog boxes, frames, panels, menus, buttons, icons, etc. are examples of the graphical user interface elements.

Furthermore, on transitioning from the unlaunched state to the launched state the messaging application is configured to cause the database to be decrypted and to store the authorisation token in the volatile memory. Typically, the 'volatile memory' of the user device refers to a portion of the computer storage in the user device, wherein the volatile memory stores information temporarily therein. Specifically, the volatile memory loses the information stored therein, when power supplied to the volatile memory or the user device is lost. More specifically, the volatile memory of the computer storage is implemented by way of the Random-Access Memory (RAM) in the computer storage.

The messaging application employs the encryption key for decryption of the encrypted database in the launched state. It will be appreciated that the encryption key is stored in the key store of the user device. Specifically, the encrypted database of data associated with the messaging application is decrypted so as to enable the messaging application to extract intelligible information pertaining to the user from the database and further perform tasks and functions instructed by the user.

Optionally, the messaging application processes information comprised in the database of data associated with the messaging application so as to perform tasks. Typically, such tasks for the messaging application includes notifying the user of the messaging application about any incoming call and/or message, executing settings applied by the user, performing actions (such as sending replies, sharing information, forwarding message, calling, deletion and so forth) specified by the user, allocating resources (such as messaging server) of the messaging application for the user, and so forth.

As noted above, the messaging application may generate the decryption key for the decryption of the encrypted database based on a user passcode. In this situation, only if the user provides the correct user passcode will the database be decrypted to enable the messaging application to transition from the unlaunched state to the launched state. If the wrong passcode is entered, the database will not be decrypted, and the messaging application will not transition from the unlaunched to the launched state.

Preferably, the encryption key for the encryption of the database is generated afresh upon each login operation or attempt. The term 'login operation' refers to an action of entering a passcode in an attempt to log in to the messaging application. With this approach there is no need to store the encryption key on the device while the database is in encrypted mode—and hence there is no copy of the encryption key on the device for a bad actor to retrieve. Optionally, the user provides the user passcode to perform the login operation on the user device. Beneficially, generating the encryption key afresh every time the user performs the login operation, rather than storing it on the device, eliminates some security weaknesses.

Additionally, on transitioning from the unlaunched state to the launched state, the authorization token is stored in volatile memory. The authorization token enables the messaging application to perform tasks, notably with the messaging server. when the messaging application is in the unlaunched state. Moreover, storing the authorisation token in the volatile memory enables quick access thereto by the messaging application to perform the tasks in the launched state, owing to fast speed of the volatile memory.

Furthermore, on transitioning from the launched state to the unlaunched state the messaging application causes the database to be encrypted and the authorisation token deleted from the volatile memory. Specifically, on transitioning from the launched state to the unlaunched state, that is, upon exiting the messaging application, the messaging application employs the generated encryption key to encrypt the database of data associated with the messaging application. Additionally, the authorisation token used to perform the tasks for the messaging application is deleted from the volatile memory thereby preventing any unauthorised access thereto once the messaging application in unlaunched. It will be appreciated that in the unlaunched state the authorisation token is stored in the key store of the user device.

Furthermore, the messaging application is configured to use the authorisation token in the key store to perform communication with the messaging server on receipt of an incoming call from the messaging server in the unlaunched state, enabling display of a notification of the incoming call, on the display of the user device. For reasons of privacy and security, notifications in the unlaunched state preferably do not show contact information. It will be appreciated that in the unlaunched state, the database is encrypted using the encryption key and the authorisation token is stored in the key store.

Optionally, the messaging server transfers the incoming call from messaging application loaded on the at least one remote device to the messaging application loaded on the user device. Moreover, the messaging server establishes connection for communication between the user of the user device and the one or more users of the at least one remote device.

The expression "the calling party" refers to the one or more users of the (at least one) remote device.

The term "notification" refers to an alert communicated to provide information. In accordance with an embodiment of the present disclosure, a notification is provided by the messaging application to the user of the user device having the messaging application loaded therein, on receipt of an incoming call from the calling party. Furthermore, the notification is provided to the user by presenting notification information on the display of the user device. Optionally, the notification may be time-sensitive. Optionally, the notification may be provided to the user by way of an audio signal, a visual signal, a mechanical signal (e.g. a haptic signal such as vibrations), or a combination thereof.

The expression "contact information" refers to information that is employed for communication. Specifically, the contact information may be employed for communication between the user and the calling party. Typically, the contact information may be stored in the database of data associated with the messaging application. Optionally, the contact information comprises at least one of: a name of the calling party, an address of the calling party, a contact number of the calling party, an e-mail address of the calling party, an organisation associated with the calling party (for example, an organisation where the calling party is employed), a label relating to the calling party (for example, family, friend, work, and so on), and a relationship between the user and the calling party.

Furthermore, the messaging application retrieves the extracted information in the authorisation token from the key store to perform the communication with the calling party of the incoming call, via the messaging server, when the messaging application is in unlaunched state. Consequently, the messaging application displays a notification of the incoming call from the calling party, wherein the notification of the incoming call is presented on the display of the user device. Additionally, the notification of the incoming call is presented on the display of the user device without the contact information of the calling party. In an example, the notification for the incoming call may be presented using a mechanical signal (namely, vibration) on the display of the user device, wherein the notification reads "Incoming call".

Optionally, the messaging application is configured to retrieve the authorisation token from the key store to perform communication with the messaging server on receipt of an incoming message from the messaging server in the unlaunched state, and to display a notification of the incoming message on the display of the device without contact information and without message preview. In other words, the extracted information in the authorisation token from the key store is employed to perform communication between the user and a messaging party sending the incoming message, via the messaging server. Furthermore, when the messaging application is in the unlaunched state, the notification of the incoming message may be provided to the user without displaying a message preview or contact information. Specifically, the message preview refers to part or all of the content of an incoming message communicated by the messaging party. Optionally, message preview may include the subject of the incoming message.

In such case, the contents of the notification may be hidden. In an example, the notification for the incoming message may be presented using a mechanical signal (namely, vibration) on the display of the user device, wherein the notification reads 'One new message'. This feature enables a user to be aware of the existence of incoming messages while avoiding the risk that other parties can gain knowledge of the identity of the sender of the message or anything about the contents of the message.

The messaging application is configured in the launched state to retrieve the authorisation token from the volatile memory to perform communication with the messaging server on receipt of an incoming call from the messaging server, and to display a notification of the incoming call, and contact information for the calling party, on the display of the user device. As mentioned previously, in the launched state, the database of data associated with the messaging application is decrypted and the authorisation token is stored in the volatile memory of the computer storage.

Subsequently, the messaging application retrieves the extracted information in the authorisation token from the volatile memory to perform the communication with the calling party of the incoming call, via the messaging server, when the messaging application is in launched state. Consequently, the messaging application displays a notification of the incoming call from the calling party, wherein the notification of the incoming call is presented on the display of the user device. Additionally, the notification of the incoming call may be presented on the display of the user device with the contact information of the calling party. In an example, the notification for the incoming call may be presented using a mechanical signal (namely, vibration) and an audio signal, on the display of the user device, wherein the notification reads a name of the calling party 'Alice', a calling number of the calling party '0123456789' (if the messaging application operates on the basis of numbers, or alternatively some other identifier such as a SIP address), an organization of the calling party 'ABC Pvt. Co.'.

Optionally, the messaging application is configured to retrieve the authorisation token from the volatile memory to perform communication with the messaging server on receipt of an incoming message from the messaging server in the launched state, and to display a notification of the incoming message, contact information for the messaging party, and a preview of the message, on the display of the device. In other words, the extracted information in the authorisation token from the volatile memory is employed to perform communication between the user and the messaging party sending the incoming message, via the messaging server. Furthermore, when the messaging application is in the launched state, the notification of the incoming message may be provided to the user by displaying the message preview and the contact information of the messaging party. In an example, the notification for the incoming message may be presented using a mechanical signal (namely, vibration) on the display of the user device, wherein the notification reads a name of the messaging party 'Alice', a contact number of the messaging party '0123456789' (if the messaging application operates on the basis of numbers, or alternatively some other identifier such as a SIP address), on organisation of the messaging party 'ABC Pvt. Co.', and a message preview of the incoming message 'Meeting scheduled for 11 P.M.'.

The present disclosure also relates to the method as described above. Various embodiments and variants disclosed above, with respect to the aforementioned first aspect, apply mutatis mutandis to the method.

Optionally, the method further comprising: if a user passcode has been defined for access to the user device, generating the encryption key for encryption of the database based on the user passcode.

More optionally, the method comprising generating the encryption key for the encryption of the database afresh upon each login operation.

Moreover, optionally, the method comprising: if the user passcode has been defined for access to the user device, and if the user provides the correct user passcode, on transitioning from the unlaunched state to the launched state creating the decryption key to decrypt the data stored in the database using the messaging application In yet another aspect, an embodiment of the present disclosure provides a computer program product comprising a messaging application stored on a tangible computer readable storage medium and configured when executed on a processor of a user device to effect a secure messaging session between the user device and at least one remote device via a network and a messaging server, the messaging application having a launched state and an unlaunched state, and on transitioning from the unlaunched state to the launched state the messaging application is configured to cause an encrypted database of data, associated with the messaging application stored on the user device, to be decrypted and to store the authorisation token in a volatile memory of the user device, and on transitioning from the launched state to the unlaunched state, the messaging application is configured to cause the database to be encrypted and the authorisation token to be deleted from the volatile memory;

wherein the messaging application is configured, in the unlaunched state, on receipt of an incoming call from the messaging server, to retrieve the authorisation token from the key store to perform communication with the messaging server, and to display a notification of the incoming call on a display of the user device; and wherein the messaging application is configured, in the launched state, on receipt of an incoming call from the messaging server, to retrieve the authorisation token from the volatile memory to perform communication with the messaging server, and to display a notification of the incoming call, and contact information for a calling party, on a display of the user device.

Optionally, the computer readable medium comprises one of a floppy disk, a hard disk, a SIM card, a flash memory, a high capacity read only memory in the form of an optically read compact disk or CD-ROM, a DVD, a tape, a read only memory (ROM), and a Random-Access memory (RAM).

In yet another aspect, an embodiment of the present disclosure provides a user device comprising:

a display;

computer storage configured to store: a messaging application for effecting a secure messaging session between the user device and at least one remote device, via a network and a messaging server; and an encrypted database of data associated with the messaging application;

a processor configured to execute the messaging application;

a key store storing an authorisation token to be used by the messaging application; the messaging application having a launched state and an unlaunched state, and on transitioning from the unlaunched state to the launched state the messaging application is configured to cause the database to be decrypted and to store the authorisation token in volatile memory, and on transitioning from the launched state to the unlaunched state the messaging application causes the database to be encrypted and the authorisation token deleted from the volatile memory;

wherein the messaging application is configured, in the unlaunched state, on receipt of an incoming message from the messaging server, to retrieve the authorisation token from the key store to perform communication with the messaging server, and to display a notification of the incoming message on the display of the user device without contact information and without a message preview; and wherein the messaging application is configured, in the launched state, on receipt of an incoming message from the messaging server, to retrieve the authorisation token from the volatile memory to perform communication with the messaging server, and to display a notification of the incoming message, contact information for a messaging party, and the message preview, on the display of the user device.

Optionally, the messaging application is configured, in the unlaunched state, on receipt of an incoming call from the messaging server, to retrieve the authorisation token from the key store to perform communication with the messaging server, and to display a notification of the incoming call, without contact information, on the display of the user device; and wherein the messaging application is configured, in the launched state, on receipt of an incoming call from the messaging server, to retrieve the authorisation token from the volatile memory to perform communication with the messaging server, and to display a notification of the incoming call, and contact information for the calling party, on the display of the user device.

DETAILED DESCRIPTION OF THE DRAWINGS

Referring to FIG. 1, there is shown a schematic illustration of a network environment 100 in which a user device 102 having a messaging application 112 is implemented for effecting a secure messaging session and providing notifications received in the messaging application 112, in accordance with an embodiment of the present disclosure. The network environment 100 comprises the user device 102 having the messaging application 112 loaded therein for effecting the secure messaging session between the user device 102 and at least one remote device (depicted as a remote device 118). Furthermore, the messaging session between the user device 102 and the remote device 118 is effected via a network 120 and a messaging server 116.

Furthermore, the user device 102 comprises a display 104, computer storage 106, a processor 108, and a key store 110. The computer storage 106 is configured to store the messaging application 112 for effecting the secure messaging session and an encrypted database 114 of data associated with the messaging application. The processor 108 is configured to execute the messaging application 112. Additionally, the key store 110 stores an authorisation token to be used by the messaging application 112 to enable communication with the messaging server 116.

The messaging application 112 has a launched state (not shown) and an unlaunched state (not shown), wherein on transitioning from the unlaunched state to the launched state the messaging application 112 is configured to cause the database 114 to be decrypted and to store the authorisation token in a volatile memory (not shown), and on transitioning from the launched state to the unlaunched state the messaging application 112 causes the database 114 to be encrypted and the authorisation token to be deleted from the volatile memory.

Furthermore, the messaging application 112 is configured to retrieve the authorisation token from the key store 110 to perform communication with the messaging server 116 on receipt of an incoming call from the messaging server 116 in the unlaunched state. Additionally, the messaging application 112 is configured to display a notification of the incoming call, without contact information, on the display 104 of the user device 102.

Moreover, the messaging application 112 is configured in the launched state to retrieve the authorisation token from the volatile memory to perform communication with the messaging server 116 on receipt of an incoming call from the messaging server 116. Additionally, the messaging application 112 is configured to display a notification of the incoming call and contact information for the calling party, on the display 104 of the user device 102.

It will be understood by a person skilled in the art that the FIG. 1 depicts a simplified network environment 100 in which the user device 102 having the messaging application 112 is implemented for effecting a secure messaging session and providing notification of a call received in the messaging application 112 for the sake of clarity only, which should not unduly limit the scope of the claims herein. The person skilled in the art will recognize many variations, alternatives, and modifications of embodiments of the present disclosure.

Figure 2:
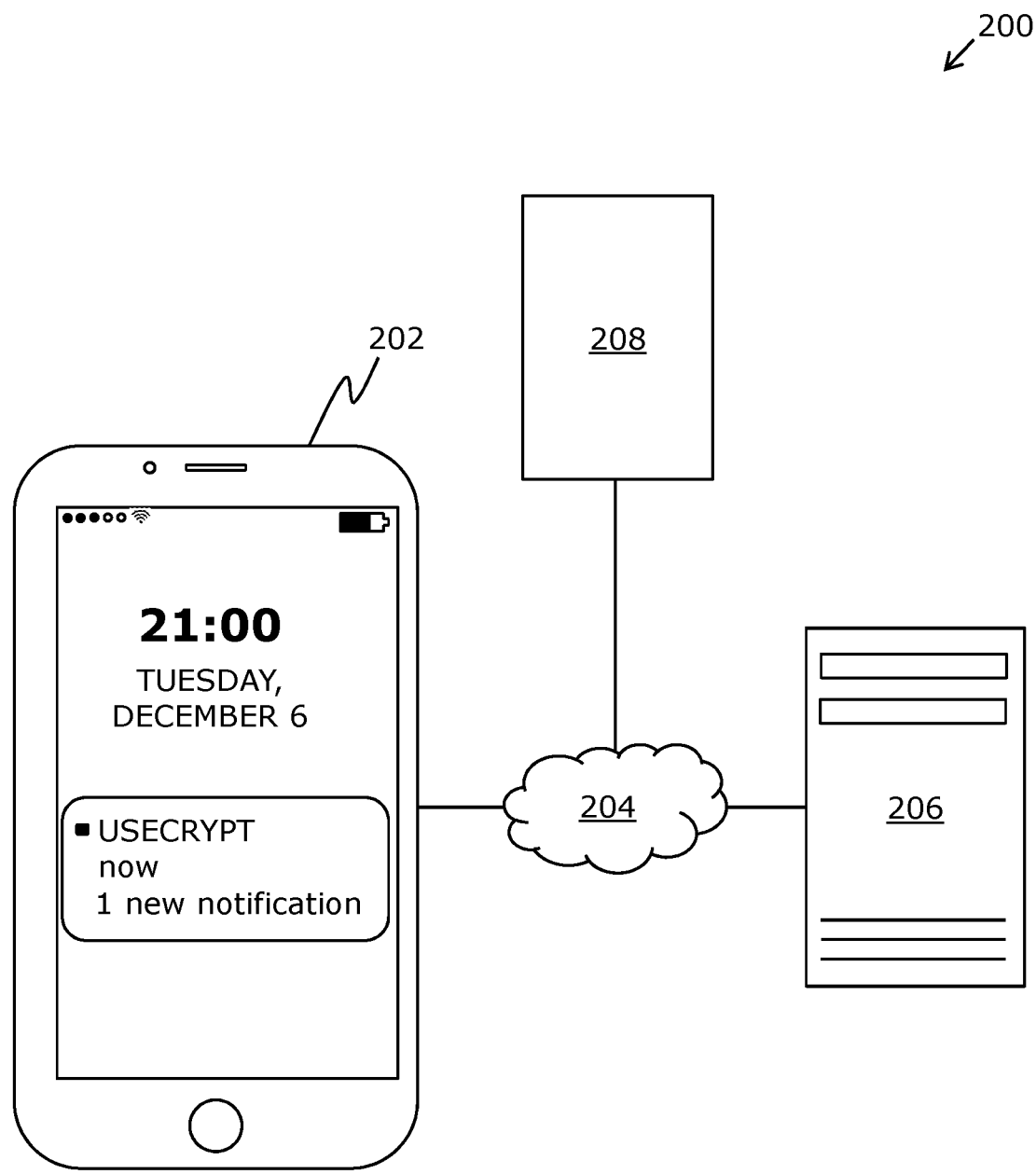
FIG. 2 is a schematic illustration of an exemplary implementation of a network environment, wherein a user device having a messaging application is implemented for effecting a secure messaging session and providing notification of a call received in the messaging application, in accordance with an embodiment of the present disclosure.

Referring to FIG. 2, there is shown a schematic illustration of exemplary implementation of a network environment 200, wherein a user device 202 having a messaging application (not shown) is implemented for effecting a secure messaging session and providing notification of a call received in the messaging application, in accordance with an embodiment of the present disclosure. The network environment 200 comprises the user device 202 having the messaging application, wherein the messaging application is implemented for effecting a secure messaging session between the user device 202 and at least one remote device (depicted as a remote device 208). The secure messaging session between the user device 202 and the remote device is 208 is effected via a network 204 and a messaging server 206.

It will be understood by a person skilled in the art that the FIG. 2 depicts a simplified exemplary implementation of the network environment 200 in which the user device 202 having a messaging application is implemented for effecting a secure messaging session and providing notification of a call received in the messaging application, for the sake of clarity only, which should not unduly limit the scope of the claims herein. The person skilled in the art will recognize many variations, alternatives, and modifications of embodiments of the present disclosure.

Figure 3:
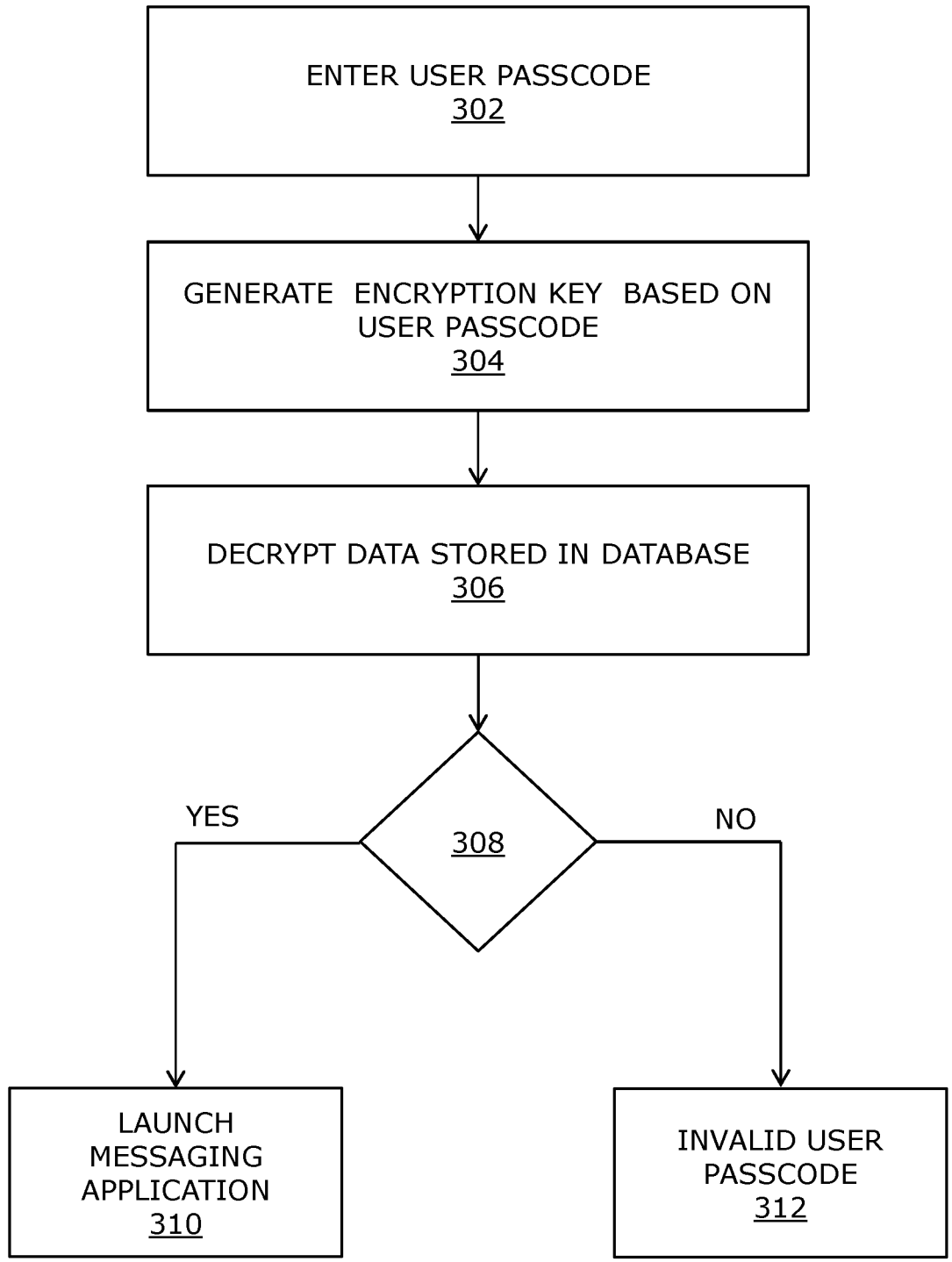
FIG. 3 is a flow chart illustrating the processing of an entered passcode, in accordance with an embodiment of the present disclosure.

Referring to FIG. 3, there is shown a flow chart illustrating processing of an entered user passcode, in accordance with an embodiment of the present disclosure.

At a step 302, the user enters a user passcode.

At a step 304, an encryption key is generated based on the user passcode.

At a step 306, decryption of data stored in database is attempted.

At a step 308, successful decryption of the data stored in the database is verified.

If at the step 308, the decryption of the data stored in the database is successful, at a step 310 the messaging application is launched.

If at the step 308, the decryption of the data stored in the database is unsuccessful, at a step 312 the user passcode is determined as invalid.

The steps 302, 304, 306, 308, 310 and 312 are only illustrative and other alternatives can also be provided where one or more steps are added, one or more steps are removed, or one or more steps are provided in a different sequence without departing from the scope of the claims herein.

Figure 4:
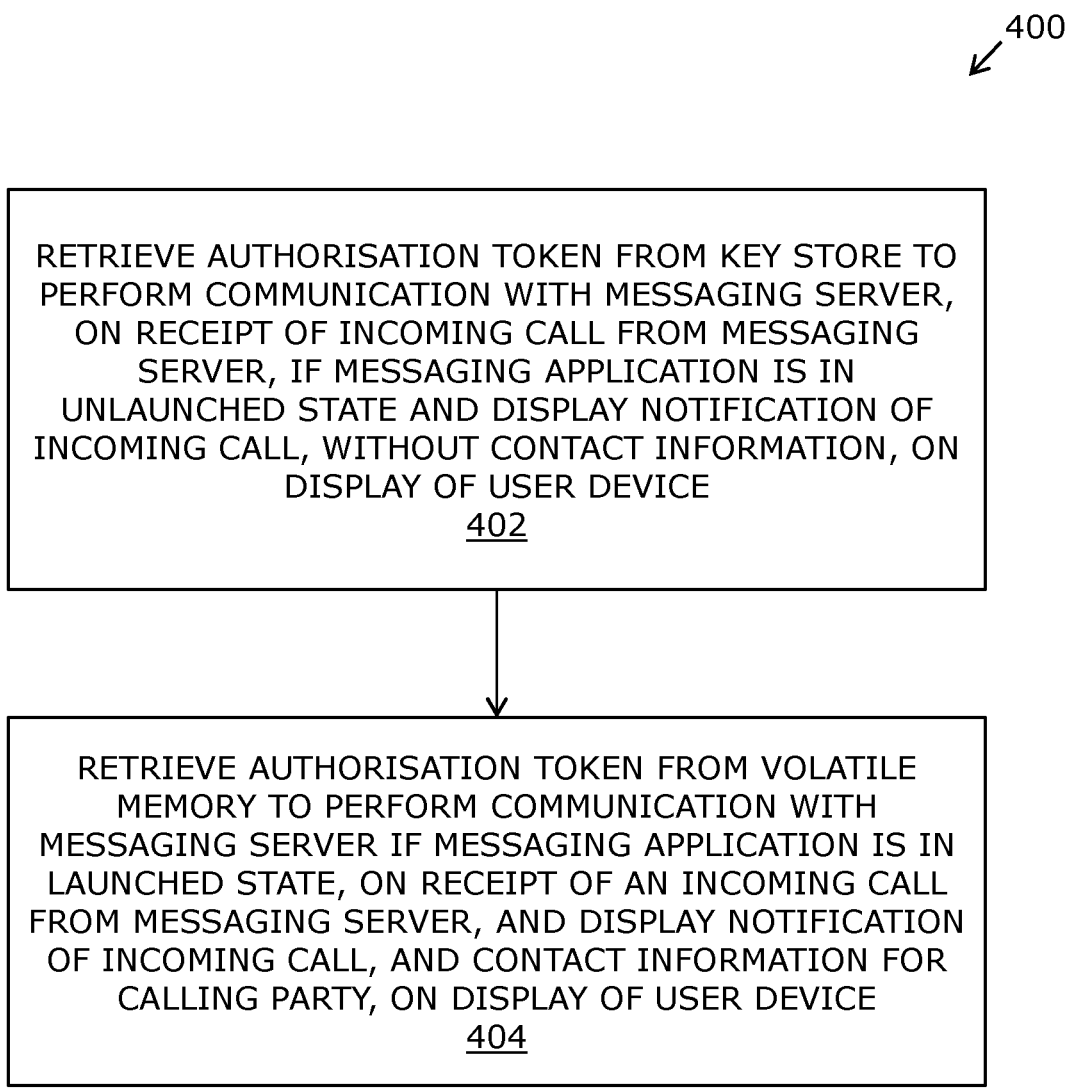
FIG. 4 is an illustration of steps of a method of providing notification of a call received and effecting a secure messaging session in a messaging application loaded on a user device, in accordance with an embodiment of the present disclosure.

Referring to FIG. 4, there is shown steps of a method of providing notification of a call received and effecting a secure messaging session in a messaging application loaded on a user device. The method is depicted as a collection of steps in a logical flow diagram, which represents a sequence of steps that can be implemented in hardware, software, or a combination thereof, for example as aforementioned.

The method is implemented via the user device having the messaging application, the user device comprising a display, computer storage configured to store the messaging application and an encrypted database of data associated with the messaging application, a processor configured to execute the messaging application, and a key store storing an authorisation token to be used by the messaging application.

The messaging application has a launched state and an unlaunched state, wherein on transitioning from the unlaunched state to the launched state the messaging application is configured to cause the database to be decrypted and to store the authorisation token in volatile memory, and on transitioning from the launched state to the unlaunched state the messaging application causes the database to be encrypted and the authorisation token deleted from the volatile memory.

At a step 402, the authorisation token from the key store is retrieved to perform communication with the messaging server, if the messaging application is in the unlaunched state on receipt of an incoming call from the messaging server, and a notification of the incoming call is displayed, without contact information, on the display of the user device.

At a step 404, the authorisation token is retrieved from the volatile memory to perform communication with the messaging server, if the messaging application is in the launched state on receipt of an incoming call from the messaging server, and a notification of the incoming call and contact information for a calling party is displayed on the display of the user device.

The steps 402 and 404 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A user device comprising:
a display;
computer storage configured to store:
a messaging application for effecting a secure messaging session between the user device and at least one remote device, via a network and a messaging server; and an encrypted database of data associated with the messaging application;
a processor configured to execute the messaging application;
a key store storing an token to be used by the messaging application;
the messaging application having a launched state and an unlaunched state, and on transitioning from the unlaunched state to the launched state the messaging application is configured to cause the database to be decrypted and to store the authorization token in volatile memory, and on transitioning from the launched state to the unlaunched state the messaging application causes the database to be encrypted and the authorization token deleted from the volatile memory;
wherein the messaging application is configured, in the unlaunched state, on receipt of an incoming call from the messaging server, to retrieve the authorization token from the key store to perform communication with the messaging server, and to display a notification of the incoming call, without contact information, on the display of the user device; and
wherein the messaging application is configured, in the launched state, on receipt of an incoming call from the messaging server, to retrieve the authorization token from the volatile memory to perform communication with the messaging server, and to display a notification of the incoming call, and contact information for the calling party, on the display of the user device.

2. The user device of claim 1, wherein the messaging application is configured, in the unlaunched state, on receipt of an incoming message from the messaging server, to retrieve the authorization token from the key store to perform communication with the messaging server, and to display a notification of the incoming message on the display of the user device without contact information and without a message preview; and
wherein the messaging application is configured, in the launched state, on receipt of an incoming message from the messaging server, to retrieve the authorization token from the volatile memory to perform communication with the messaging server, and to display a notification of the incoming message, contact information for a messaging party, and the message preview, on the display of the user device.

3. The user device of claim 1, wherein, if a user passcode has been defined for access to the user device, the encryption key for encryption of the database is generated based on the user passcode.

4. The user device of claim 3, wherein the encryption key for the encryption of the database is generated afresh upon each login operation.

5. The user device of claim 3, wherein, if a user passcode has been defined for access to the user device, and if the user provides the correct user passcode, on transitioning from the unlaunched state to the launched state the messaging application is configured to create the decryption key to decrypt the data stored in the database.

6. The user device of claim 5, wherein the messaging application is configured to create a decryption key based on an entered passcode without first comparing the entered passcode with a stored passcode, and is further configured to delete the stored database in the event that more than a threshold number of passcode entry attempts are made without entry of the user defined passcode.

7. The user device of claim 1, wherein the database is encrypted using AES256.

8. A method of providing notification of a call received in a messaging application loaded on a user device, the user device comprising:
a display;
computer storage configured to store: the messaging application for effecting a secure messaging session between the user device and at least one remote device, via a network and a messaging server; and an encrypted database of data associated with the messaging application;
a processor configured to execute the messaging application;
a key store storing an authorization token to be used by the messaging application;

the messaging application having a launched state and an unlaunched state, and on transitioning from the unlaunched state to the launched state the messaging application is configured to cause the database to be decrypted and to store the authorization token in volatile memory, and on transitioning from the launched state to the unlaunched state the messaging application causes the database to be encrypted and the authorization token deleted from the volatile memory;

the method comprising:

if the messaging application is in the unlaunched state, on receipt of an incoming call from the messaging server, retrieving the authorization token from the key store to perform communication with the messaging server, and displaying a notification of the incoming call, without contact information, on the display of the user device; and if the messaging application is in the launched state, on receipt of an incoming call from the messaging server, retrieving the authorization token from the volatile memory to perform communication with the messaging server, and displaying a notification of the incoming call, and contact information for the calling party, on the display of the user device.

9. The method of claim 8, the method comprising: if a user passcode has been defined for access to the user device, generating the encryption key for encryption of the database based on the user passcode.

10. The method of claim 9, the method comprising generating the encryption key for the encryption of the database afresh upon each login operation.

11. The method as claimed in claim 9, the method comprising: if the user passcode has been defined for access to the user device, and if the user provides the correct user passcode, on transitioning from the unlaunched state to the launched state creating the decryption key to decrypt the data stored in the database using the messaging application.

12. The method as claimed in claim 11, the method further comprising: creating a decryption key based on an entered passcode without first comparing the entered passcode with a stored passcode, and deleting the stored database in the event that more than a threshold number of passcode entry attempts are made without entry of the user defined passcode.

13. A computer program product comprising a messaging application stored on a tangible computer readable storage medium and configured when executed on a processor of a user device to effect a secure messaging session between the user device and at least one remote device via a network and a messaging server, the messaging application having a launched state and an unlaunched state, and on transitioning from the unlaunched state to the launched state the messaging application is configured to cause an encrypted database of data, associated with the messaging application and stored on the user device, to be decrypted and to store the authorization token in a volatile memory of the user device, and on transitioning from the launched state to the unlaunched state the messaging application is configured to cause the database to be encrypted and the authorization token to be deleted from the volatile memory;

wherein the messaging application is configured, in the unlaunched state, on receipt of an incoming call from the messaging server, to retrieve the authorization token from the key store to perform communication with the messaging server, and to display a notification of the incoming call on a display of the user device; and wherein the messaging application is configured, in the launched state, on receipt of an incoming call from the messaging server, to retrieve the authorization token from the volatile memory to perform communication with the messaging server, and to display a notification of the incoming call, and contact information for the calling party, on a display of the user device.

14. The computer program product of claim 13, wherein the messaging application is configured to create a decryption key based on an entered passcode without first comparing the entered passcode with a stored passcode, and is further configured to delete the stored database in the event that more than a threshold number of passcode entry attempts are made without entry of the user defined passcode.

15. A user device comprising:

a display;

computer storage configured to store: a messaging application for effecting a secure messaging session between the user device and at least one remote device, via a network and a messaging server; and an encrypted database of data associated with the messaging application;

a processor configured to execute the messaging application;

a key store storing an authorization token to be used by the messaging application;

the messaging application having a launched state and an unlaunched state, and on transitioning from the unlaunched state to the launched state the messaging application is configured to cause the database to be decrypted and to store the authorizaion token in volatile memory, and on transitioning from the launched state to the unlaunched state the messaging application causes the database to be encrypted and the authorization token deleted from the volatile memory;

wherein the messaging application is configured, in the unlaunched state, on receipt of an incoming message from the messaging server, to retrieve the authorization token from the key store to perform communication with the messaging server, and to display a notification of the incoming message on the display of the user device without contact information and without a message preview; and wherein the messaging application is configured, in the launched state, on receipt of an incoming message from the messaging server, to retrieve the authorization token from the volatile memory to perform communication with the messaging server, and to display a notification of the incoming message, contact information for a messaging party, and the message preview, on the display of the user device.

16. The user device of claim 15, wherein the messaging application is configured, in the unlaunched state, on receipt of an incoming call from the messaging server, to retrieve the authorization token from the key store to perform communication with the messaging server, and to display a notification of the incoming call, without contact information, on the display of the user device; and wherein the messaging application is configured, in the launched state, on receipt of an incoming call from the messaging server, to retrieve the authorization token from the volatile memory to perform communication with the messaging server, and to display a notification of the incoming call, and contact information for the calling party, on the display of the user device.

\* \* \* \* \*